US008379827B2

(12) United States Patent
Srinivasan et al.

(10) Patent No.: US 8,379,827 B2
(45) Date of Patent: Feb. 19, 2013

(54) CONVEYING SERVICE INVOCATION INFORMATION WITHIN MULTIMODAL CONVERSATION SYSTEMS

(75) Inventors: Srivatsa Srinivasan, Renton, WA (US); Ankit Tandon, Bellevue, WA (US); Sundar Anantharaman, Redmond, WA (US); Vijay Manian, Redmond, WA (US); Lokesh Srinivas Koppolu, Redmond, WA (US); Vadim Eydelman, Redmond, WA (US); Aatif Awan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 12/480,495

(22) Filed: Jun. 8, 2009

(65) Prior Publication Data

US 2010/0310062 A1 Dec. 9, 2010

(51) Int. Cl.
*H04M 3/42* (2006.01)
(52) U.S. Cl. ............... 379/211.02; 379/212.01
(58) Field of Classification Search ............. 379/211.02, 379/212.01
See application file for complete search history.

(56) References Cited

U.S. PATENT DOCUMENTS

| 6,996,087 | B2 | 2/2006 | Ejzak | |
|---|---|---|---|---|
| 7,142,537 | B2 | 11/2006 | Shores et al. | |
| 7,289,616 | B2 * | 10/2007 | Punaganti Venkata et al. | 379/201.06 |
| 2006/0218291 | A1 * | 9/2006 | Zhu et al. | 709/229 |
| 2006/0294248 | A1 | 12/2006 | Kershaw | |
| 2007/0086582 | A1 | 4/2007 | Tai et al. | |
| 2007/0213013 | A1 * | 9/2007 | Kim | 455/69 |
| 2007/0213031 | A1 * | 9/2007 | Ejzak et al. | 455/406 |
| 2008/0002820 | A1 | 1/2008 | Shtiegman et al. | |
| 2009/0097632 | A1 * | 4/2009 | Carnazza et al. | 379/211.02 |
| 2009/0190734 | A1 * | 7/2009 | White et al. | 379/201.02 |
| 2009/0245499 | A1 * | 10/2009 | Wada et al. | 379/212.01 |
| 2010/0054444 | A1 * | 3/2010 | Brunson | 379/211.02 |
| 2010/0189230 | A1 * | 7/2010 | Jackson et al. | 379/88.22 |
| 2011/0040836 | A1 * | 2/2011 | Allen et al. | 709/205 |
| 2012/0021730 | A1 * | 1/2012 | Vendrow | 455/415 |

OTHER PUBLICATIONS

Alexeitsev, Denis, "Alert-Info Header URNs for Session Initiation Protocol (SIP)", Retrieved at <<http://ftp.ist.utl.pt/pub/drafts/draft-alexeitsev-bliss-alert-info-urns-00.txt>>, Aug. 18, 2008, pp. 1-11.

(Continued)

*Primary Examiner* — Creighton Smith
(74) *Attorney, Agent, or Firm* — Turk IP Law, LLC

(57) ABSTRACT

Service invocation information including call routing, reasons for redirections, and similar information are provided to party requesting a communication session and recipients of an enhanced communication system along the call routing path as the request is routed. Some of the information is filtered based on system and/or user defined rules, user permission levels, and comparable aspects.

14 Claims, 15 Drawing Sheets

OTHER PUBLICATIONS

Babu, Venkat Ramesh D, "Activation/Deactivation of Supplementary Services in IMS using Feature Code", Retrieved at <<http://ieeexplore.ieee.org//stamp/stamp.jsp?tp=&arnumber=04559101>>, Apr. 23, 2009, pp. 4.

Barnes, et al., "An Extension to the Session Initiation Protocol for Request History Information", Retrieved at <<http://old.iptel.org/ietf/allsipdir/draft-barnes-sipping-history-info-02.txt>>, Feb. 2003, pp. 13.

Schulzrinne, et al., "The Reason Header Field for the Session Initiation Protocol", Retrieved at <<http://old.iptel.org/ietf/allsipdir/draft-ietf-sip-reason-01.txt>>, May 14, 2002, pp. 1-8.

Camarillo, et al., "Transcoding Services Invocation in the Session Initiation Protocol Using Third Party Call Control", Retrieved at <<http://www.softarmor.com/wgdb/docs/draft-ietf-sipping-transc-3pcc-00.pdf>>, Feb. 3, 2004, pp. 1-15.

* cited by examiner

CONVEYING SERVICE INVOCATION INFORMATION WITHIN MULTIMODAL CONVERSATION SYSTEMS

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features.

Subscribers of enhanced communication systems with above described capabilities may employ multiple client devices and/or applications to facilitate their communications. For example, a subscriber may use a handheld device for text messaging, a desktop computer for audio and video communications, as well as application sharing. Some or all of these devices/applications may be active at the same time or at different times.

When a communication request is received at an enhanced communication system, the request may be routed multiple times until arriving at a suitable recipient who can answer the request. The requesting party may not know how the notification was routed, what the routing process utilized to reach a recipient, and which decision processes were involved in reaching the appropriate recipient. As a result the requesting party may be unaware of available resources and possible options in reaching desired solution therefore diminishing resolution satisfaction.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing routing information associated with a requested communication session to the requesting party and potential target parties as the request is being routed based on system and/or user rules in an enhanced communication system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
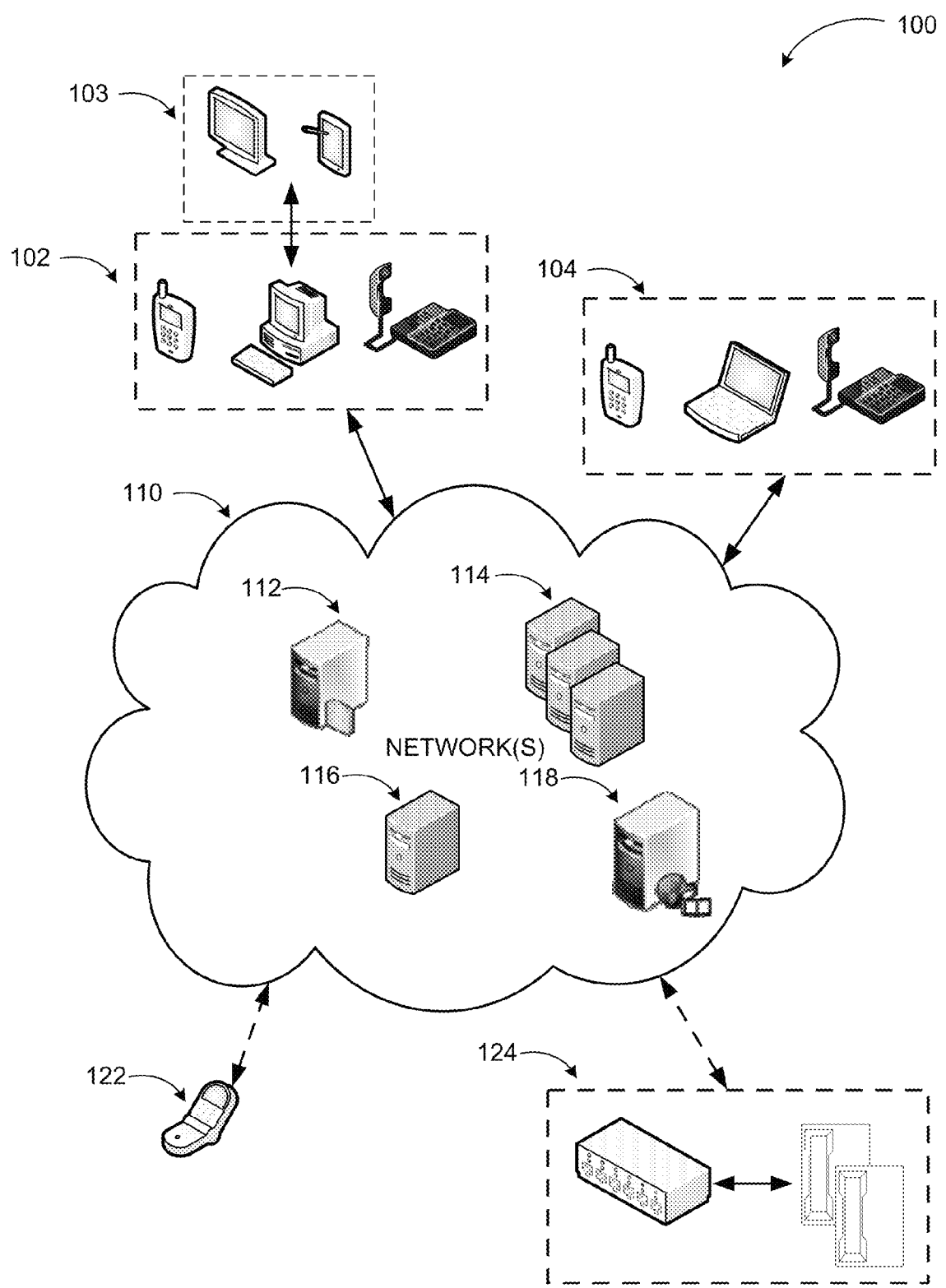
FIG. 1 is a diagram illustrating an example unified communications system, where embodiments may be implemented for conveying service invocation information as multimodal communications are routed.

As briefly described above, a notification to initiate a communication session may be forked in serial or parallel to establish the communication session with a proper recipient. Along with the routed notification, information associated with the notification and its routing history may be provided to the recipients as well as the requesting party. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "client" refers to client devices and/or applications. The term "call" is used herein to refer to any communication session within an enhanced communication system. As such a "call" may include an audio communication, a video communication, a data sharing session, a text messaging session, an application sharing session, a whiteboard sharing session, an electronic mail exchange, and similar ones. Similarly, the term "caller" or "calling party" and "called party" refer to human, machine, or software sources that initiate and accept a communication session request, respectively.

Referring to FIG. 1, diagram 100 of an example unified communications system, where embodiments may be practiced, is illustrated. A unified communication system is an example of enhanced communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. For some of the advanced communication modes, the end devices may be used in conjunction with peripheral devices 103 such as external monitors, speakers, microphones, and similar ones. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth® connection, etc.) to facilitate different aspects of the communication.

UC Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

As mentioned above, embodiments may be implemented in enhanced communications systems such as UC systems facilitating multimodal communications. A request for initiating a single or multimodal communication session (call) may be received from a party (caller) outside the UC network or within the UC network. The target of the request (called party) may have set up rules for routing received call requests. For example, calls from particular callers or regarding a particular subject matter may be forwarded to selected delegates of the called party. Routing of the calls may also be done based on system default rules such as forwarding the call to the called party's administrative assistant if the called party is unavailable. Moreover, the called party may manually deflect the call by forwarding it upon determining a source or subject matter of the call before answering.

Once the call request is being routed, the request may be sent to a single or multiple recipients of the UC system. In a relatively large system, the call request may go through several forks before it is accepted by a recipient and the requested communication session is facilitated. The communication session may begin with multiple modes of communication or with a single mode of communication and be escalated to multiple modes. Multimodal communication sessions are also referred to as conversations, where subscribers may communicate over a plurality of devices, applications, and communication modes simultaneously or sequentially. For example, two subscribers may initiate a conversation by exchanging instant messages through their desktop computers. Later, the communication may be elevated to audio and instant message with one subscriber utilizing their desktop for both modes, while the other uses the desktop computer for instant messaging and a smart phone device for the audio mode.

While the example system in FIG. 1 has been described with specific components such as mediation server, A/V server, and similar devices, embodiments are not limited to this system of the example components and configurations. An enhanced communication system conveying service invocation information as a call is being routed may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
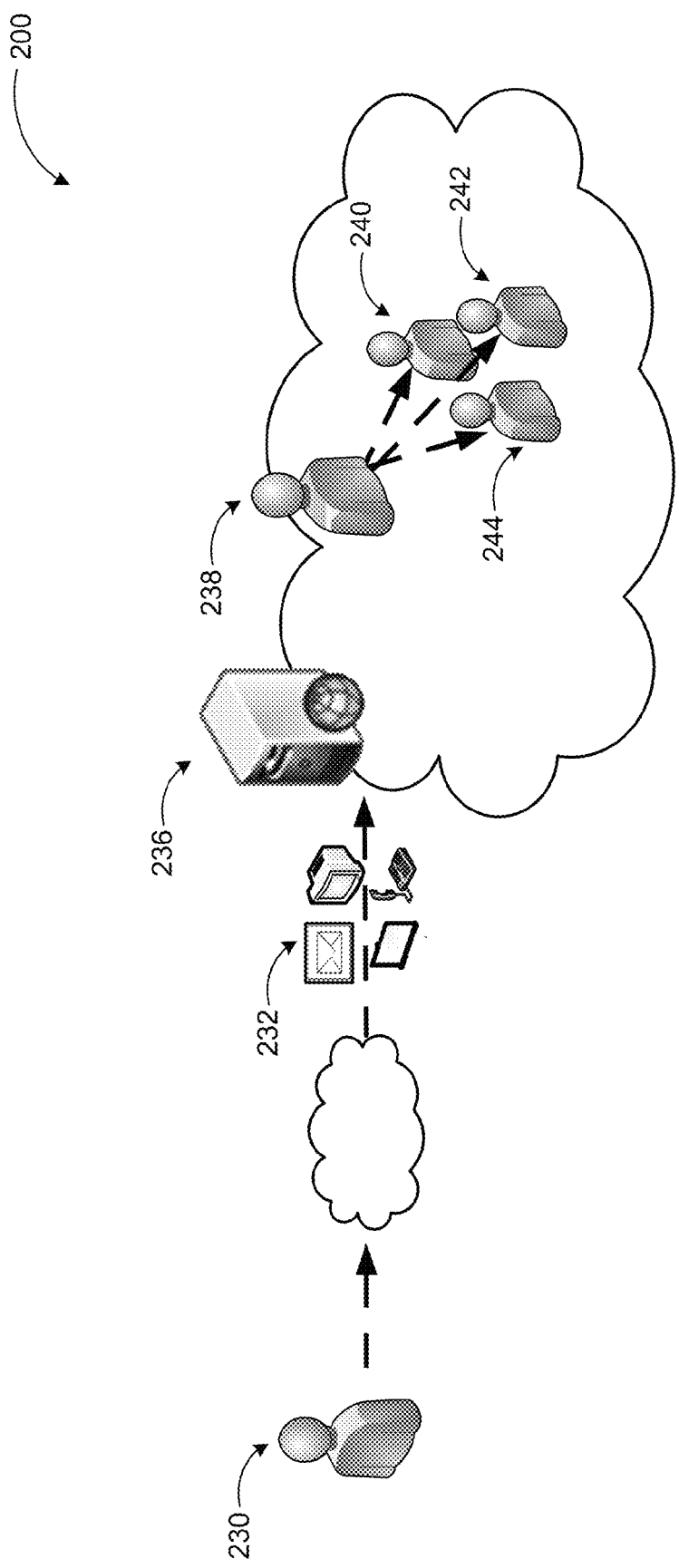
FIG. 2 is a conceptual diagram illustrating a basic example system where an incoming communication session request is redirected to recipients utilizing parallel forking.

FIG. 2 includes conceptual diagram 200 illustrating a basic example system where an incoming communication session request is redirected to recipients utilizing parallel forking. While a system according to embodiments is likely to include a number of servers, client devices, and services such as those illustratively discussed in FIG. 1, only those relevant to embodiments are shown in diagram 200 of FIG. 2.

In a system according to embodiments, caller 230 may send a request for a communication session to called party 238 in various modalities (232). Aspects of the communications within the enhanced communication network, of which called party 238 is a part, may be managed by one or more servers such as server 236. As discussed previously, the requested call may be redirected from called party 238 based on a system rule, called party 238's predefined rules, or a real time action by the called party 238. This ability for an entity to invoke specific call routing functions on a server is referred to as service invocation. When a conversation between two parties is initiated, the server applies the service invocation rules. According to one embodiment, the call may be routed to one or more delegates (240, 242, 244) in parallel (simultaneously). This is also referred to as parallel forking.

Conventional systems have limited ability to convey the service invocation indication in real time to the caller or called parties. Having this information may enable both sides to make decisions and enhance their use of the communication system. For example, caller 230 may be a customer calling a customer service center. Caller 230 may first be automatically directed to called party 238 based on automatically collected information (e.g. product type, question type, etc.). Called party 238 may not be available, and the call forked to called party 238's team members. In a system according to embodiments, service invocation information such as where the call initiated, how the call was redirected, to whom the call was redirected, a subject matter of the call, a reason for the redirection, and similar information may be provided to the team members of called party 238. Having that knowledge may help them address the caller's questions as soon as they accept the call, or help them decide which one of the team members should accept the call.

Embodiments provide means for providing the service invocation information to recipients (and the caller) regardless of the routing path(s). The service invocation information may include, for example, caller presence information. Since SIP is a commonly used communication protocol, the service invocation information may be provided within the SIP structure as SIP headers, comma separated values, or other formats. Of course, other protocols may also be employed to convey the service invocation information. For example, the information may be transmitted as metadata.

Figure 3:
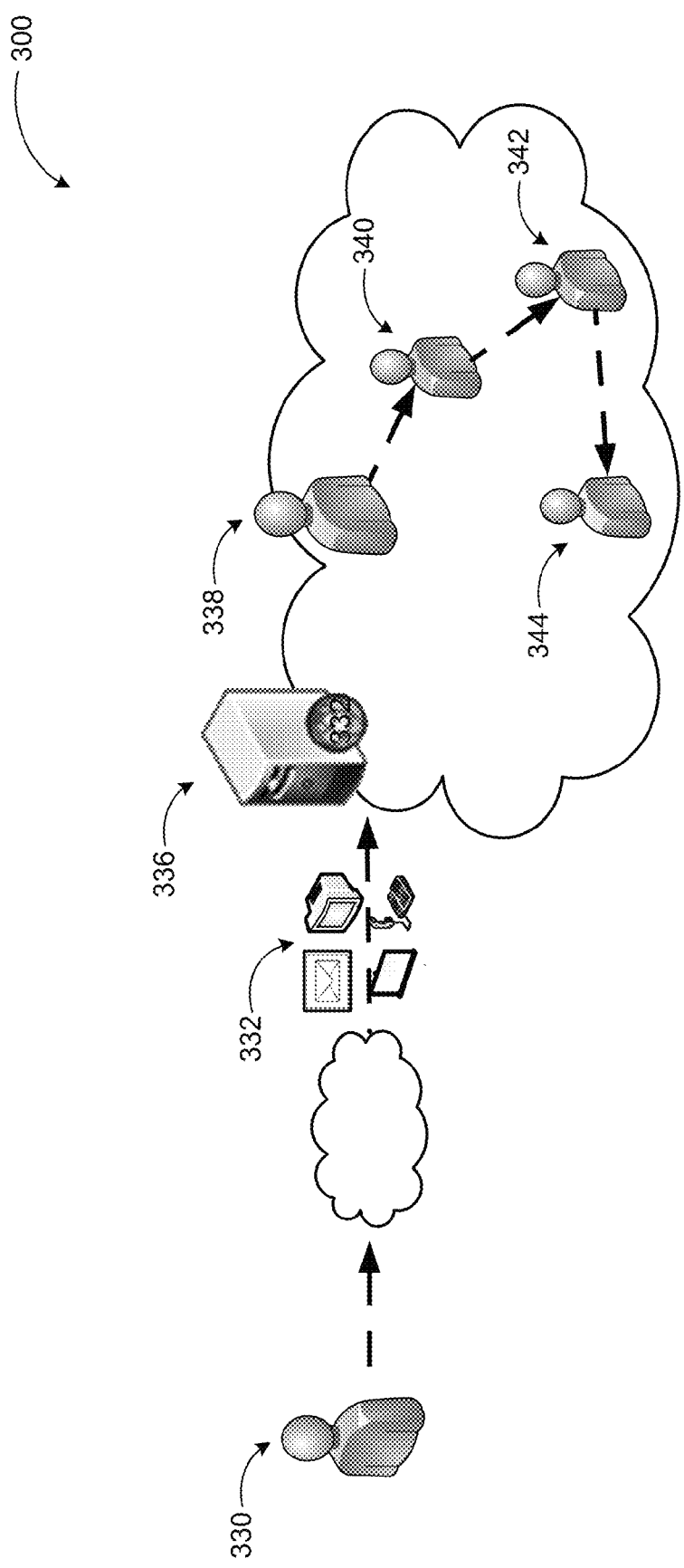
FIG. 3 is a conceptual diagram illustrating another basic example system where an incoming communication session request is redirected to recipients utilizing serial forking.

FIG. 3 includes diagram 300 illustrating a basic example system where an incoming communication session request is redirected to recipients utilizing serial forking. In a system according to embodiments, caller 330 may send a request to initiate a call with called party 338 in various modalities (332) employing different client devices. Aspects of the communications may be managed by one or more servers such as server 336. One of the aspects includes redirecting the call request utilizing serial forking to reach at least one recipient 340, 342 or 344.

Serial forking is different from parallel forking described in conjunction with the previous figure. Upon invoking a redirect rule for called party 338, the call request is forwarded to recipient 340. The call request may be redirected again to recipient 342 based on a system default rule, a recipient defined rule, or a real time action by the recipient 340. The same process may be repeated for recipient 342, and the call may end up being accepted by recipient 344. At each stage of redirection, service invocation information as described above is provided to the recipients according to embodiments. The information may enable each recipient to decide whether they should accept the call or redirect. For example, if recipient 340 is informed that called party 338 did manually redirect the call to recipient 340, he/she may accept the call instead of further redirecting.

As mentioned previously, caller 330 may also be provided with service invocation information as the call is being routed within the enhanced communication system. According to some embodiments, the information provided to the caller or the recipients may be filtered based on default rules or user defined rules. For example, the system may allow only the fact that the call is being redirected to another recipient to be provided to a caller outside the system. On the other hand, a caller within the system may receive more information such as the reason for redirecting, etc. The original called party may also define rules for how much information should be provided in association with the routing of the call request. The filtering of the provided information may also be based on permission levels of each recipient (or the caller). Embodiments are not limited to unified communication systems such as Microsoft Office Communicator System® by Microsoft Corp. of Redmond, Wash.

Figure 4:
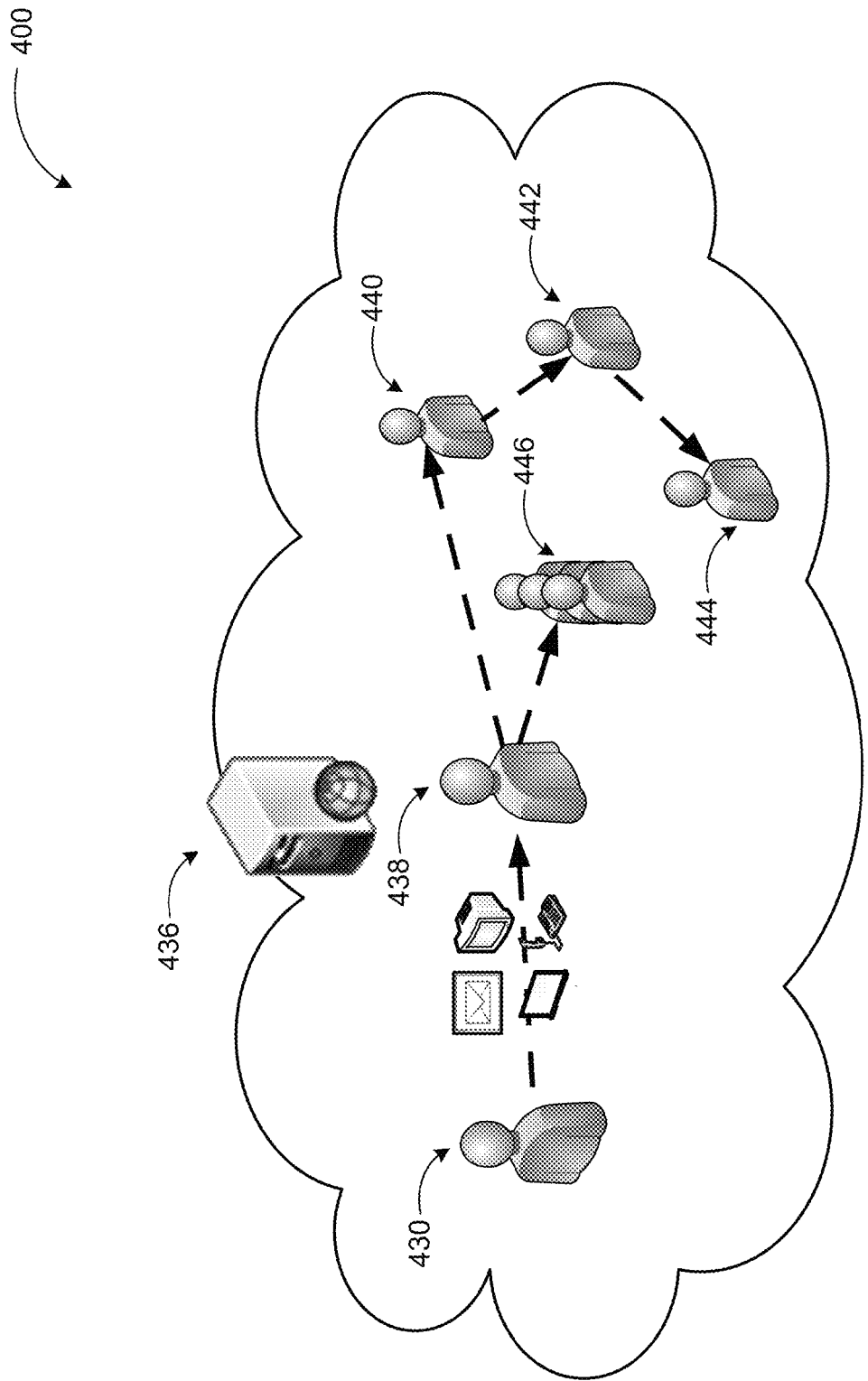
FIG. 4 is a conceptual diagram illustrating a further basic example system where a within the network initiated communication session is routed to a plurality of recipients utilizing parallel and serial forking.

FIG. 4 includes conceptual diagram 400 illustrating a further basic example system where a within the network initiated communication session is routed to a plurality of recipients utilizing parallel and serial forking.

The configuration shown in diagram 400 includes, differently from the previous two example configurations, caller 430 sending the request for single or multimodal communication session from within the enhanced communication network managed by one or more servers such as server 436. Thus, caller 430 may have more capabilities regarding communication than a caller from outside the system and may also be provided more service invocation information compared to a caller outside the system. Moreover, the call request in diagram 400 is routed through a combination of routing types. At first stage, the call is redirected to recipients 440 and 446 (which may be a group of recipients) through parallel forking. At second stage the call request is forwarded from recipient 440 to recipients 442 and 444 serially based on a system rule, a recipient defined rule, or real time recipient action.

Figure 5:
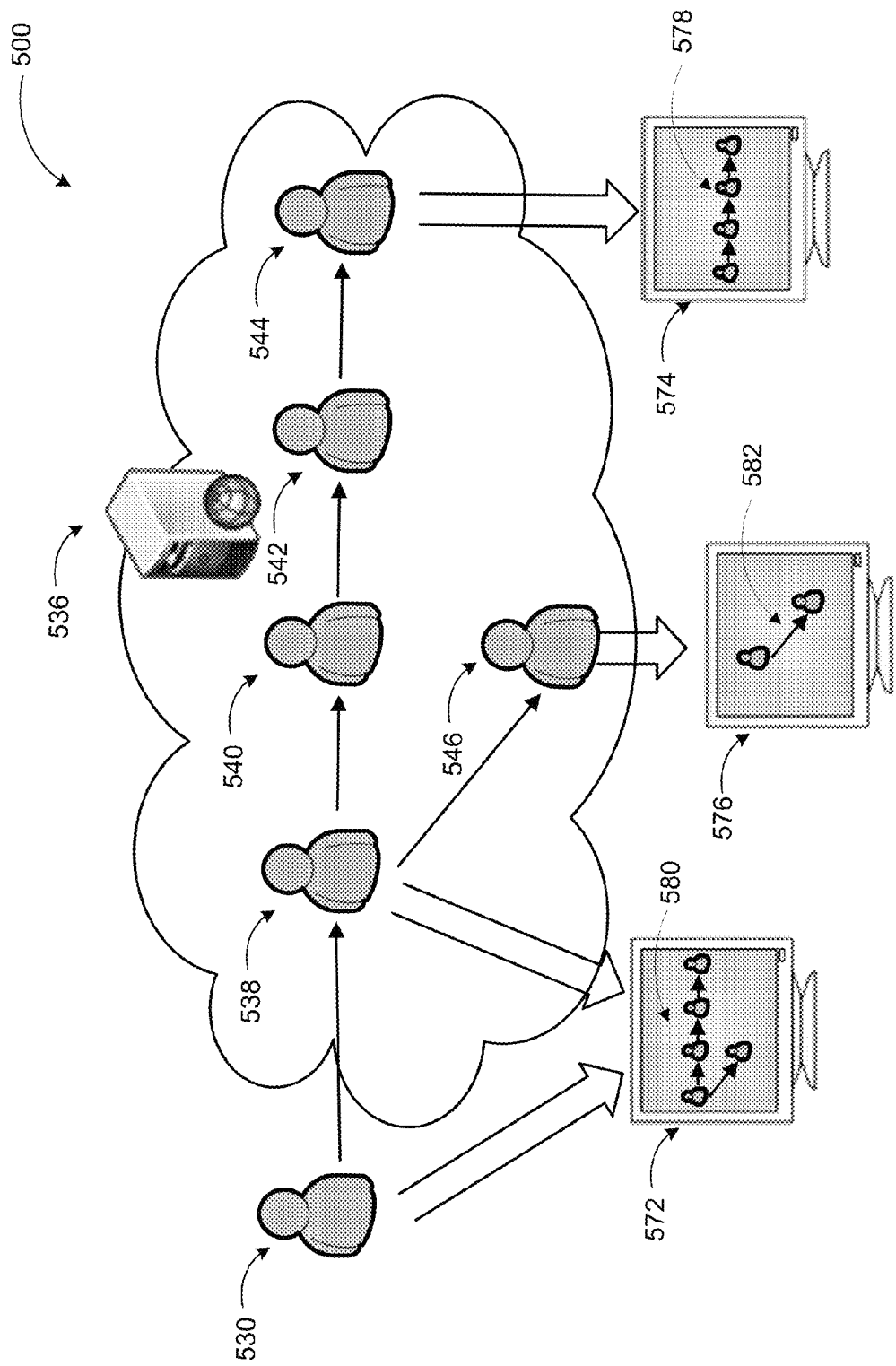
FIG. 5 illustrates paths taken by a routed call request and how the routing information may be presented to different parties associated with the call request.

FIG. 5 illustrates paths taken by a routed call request and how the routing information may be presented to different parties associated with the call request. The service invocation information may be used, among other things, to present a caller or called party (forwarded recipient) a graph of the progress for the call request depending on a location of the caller or called party on the call routing path.

In the example scenario of diagram 500, caller 530 sends a call request to initiate a communication session with called party 538 within a communication system managed by one or more servers such as server 536. The call request is redirected at called party 538 to recipients 540 and 546 through parallel forking, then again at recipients 540, 542, and 544 through serial forking. Depending on access privileges, caller 530 and called party 538 may be enabled to view an entire path 580 of the call routing as it happens on a monitor such as 572. Further information such as reason for redirection at each stage, call subject matter, availability or other information associated with each recipient, and so on, may also be provided along with a of call routing progress. The recipient 546 may view a partial path 582 of the call routing on his monitor 576, since that branch of the routing tree ends at recipient 546 and is independent from the other (serial) branch.

As another example, recipient 544 may view the entire serial branch of the routed call request 578 on his monitor 574, since that branch is independent from the branch of the call routing tree directed at recipient 546. As mentioned previously, the information provided to the caller and other recipients may be filtered based on their permission levels, system default rules, and rules defined by the recipients upstream from a recipient receiving the information.

Figure 6:
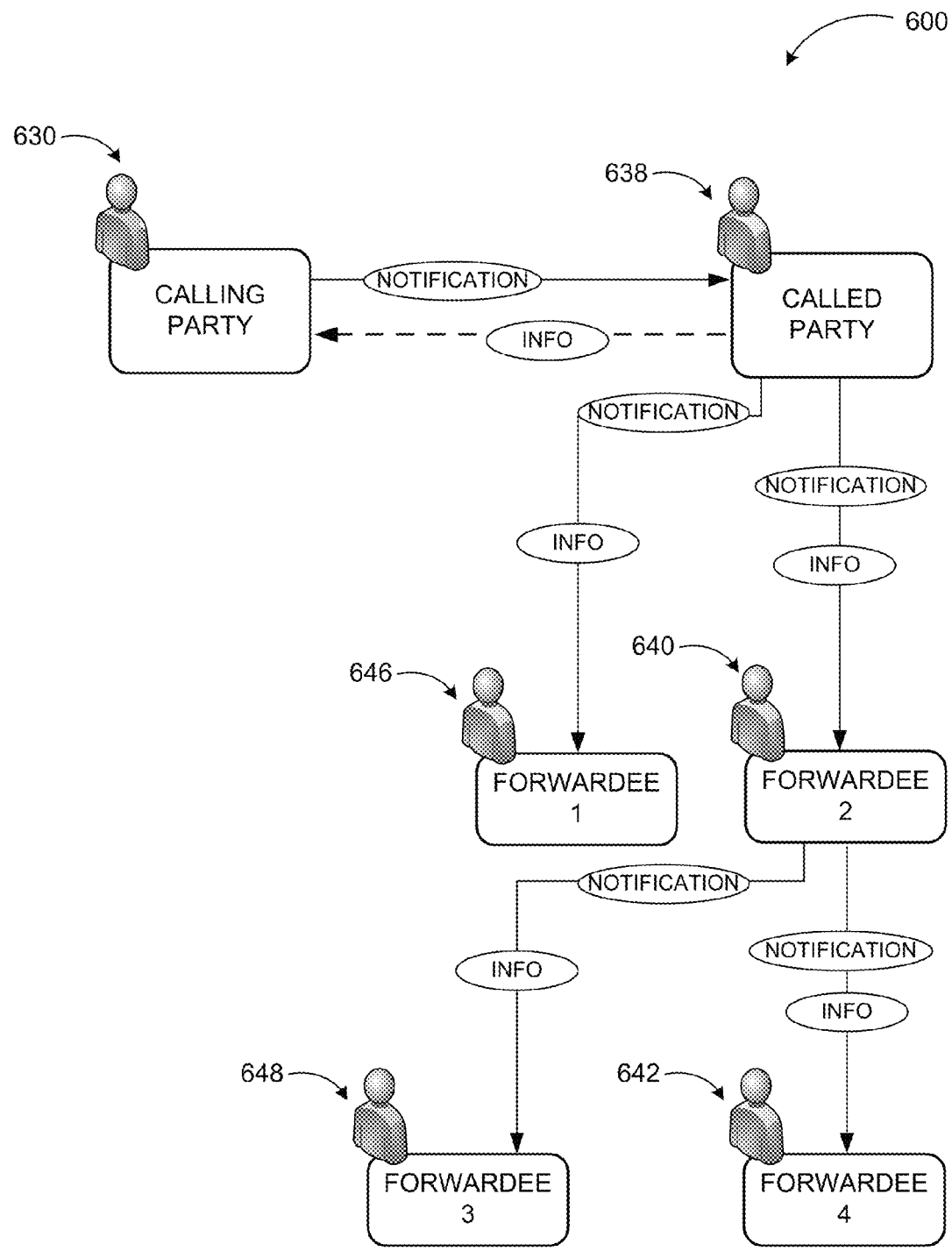
FIG. 6 illustrates transmittal of a call request notification and associated information as the call request is routed through different paths.

FIG. 6 illustrates transmittal of a call request notification and associated information as the call request is routed through different paths. Caller 630 sends a notification to called party 638 to initiate a call. Following the notification called party 638 may pass the call request downstream by forking in parallel and sending notifications to forwardee 640 and forwardee 646. Forwardee 640 may pass the call request further downstream by forking in parallel and sending notifications to forwardee 642 and forwardee 648. The call routing path information along with additional service invocation information may be passed back to called party 638. In addition to each of the forwardees receiving service invocation information up to their node in the system, caller 630 may also receive service invocation information subject to filtering based on predefined rules as discussed previously.

The service invocation information may be conveyed throughout the system as metadata within the communication protocol. For example, in an enhanced communication system (e.g. unified communication) SIP headers may be employed to provide the service invocation information. Specific SIP headers may be defined within the protocol such as a history-info header that includes parameters like routing history of the call request, reasons for redirections, and similar information. The information may also be conveyed in other formats such as comma separated parameter listings, and the like. Default headers may be defined based on commonly used information and additional custom headers may be defined for systems utilizing custom information (e.g. presence information, subject matter information, etc.).

Furthermore, the headers may define which portion of the information is to be provided to a particular person along the routing path. Alternatively, the communication system may define user permissions based on each user's permission levels and SIP headers containing service invocation information.

FIG. 7 through FIG. 12 illustrate actions between endpoints and servers of a system according to embodiments under various example scenarios for call redirection. In these example interactions, a history information header as mentioned above may be employed. The history information header may be a SIP header used as a standard mechanism for capturing the history information associated with a Session Initiation Protocol (SIP) request. This capability enables many enhanced services by providing the information as to how and why a call arrives at a specific application or user.

An example history information header may look like:

```
History-Info: <sip:Bob@P1.example.com?Reason=SIP;cause=302;
   Text="Moved Temporarily">;index=1,
      <sip:User2@UA2.example.com?Reason=SIP;
      cause=408;text="RequestTimeout">;index=1.1,
      <sip:User3@UA3.example.com?Reason=SIP; \
      cause=486;text="Busy Here">; index=1.2,
      <sip:Carol@P1.example.com>;index=2
```

In the above example, the history-info header shows that the SIP request was addressed to Bob and was forked to User2 and User3 both of whom rejected the call with the reason being "408 Timeout" and "486 Busy Here" respectively. The call was then routed to Carol based on some call processing rules on the proxy.

In a system according to embodiments, the server managing call routing may add a history-info header to a communication session request (INVITE) if it is redirecting that INVITE to one or more users besides the original target of the request. The server may also add a history-info entry for the new target of the request. The history-info header may not capture retargeting in scenarios where multiple endpoints are registered for the same user, since the history information is useful the retargeting is happening from one user to another. When adding a history-info header for the entity being retargeted, a header parameter associated with the reason of retargeting may be added with values like "forwarding", "team-call", "delegation", and the like.

As illustrated in the example interactions below, when a subscriber initiates a communication request, messages are exchanged between the subscriber's application and the call routing server while the call is being routed, these pre-media exchanges enable all participants in the conversation to promptly facilitate the communication once a target subscriber has accepted the request and avoid delays in setting up the conversation. Thus, the call routing server may include the top level history-info header in a redirection response to the caller so that the caller is aware of what kind of redirection (team call, boss/admin) is happening. However, due to privacy reasons, the server may leave out the history-info entries for the entities to which the INVITE is retargeted i.e. team members in case of a team call.

Figure 7:
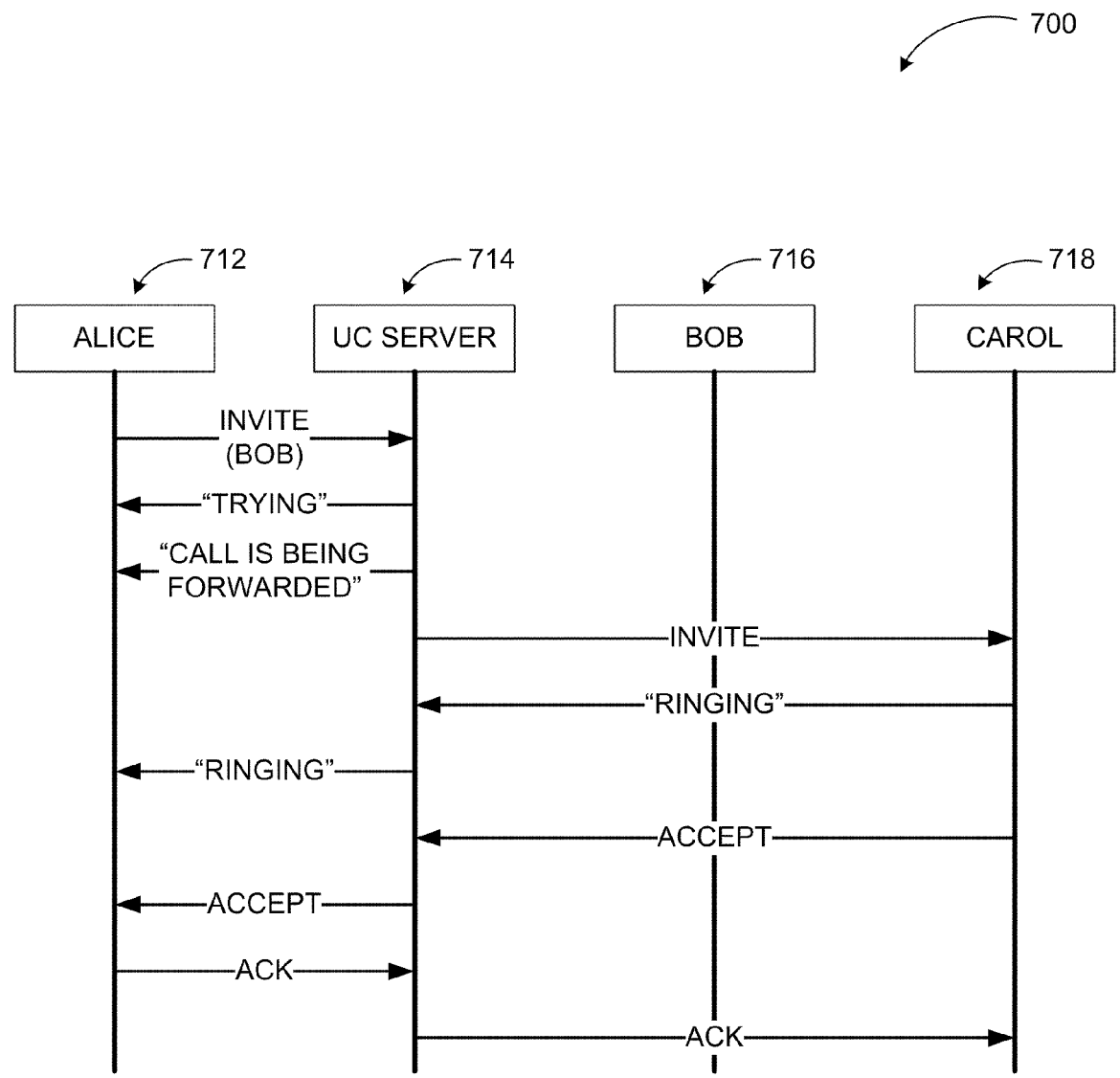
FIG. 7 through FIG. 12 illustrate actions between endpoints and servers of a system according to embodiments under various example scenarios for call redirection.

According to the example scenario illustrated in diagram 700 of FIG. 7, Alice 712 calls Bob 716 who has static unconditional forwarding set to Carol 718. UC server 714 forwards the call to Carol 718 and in the INVITE sent to Carol, a history-info entry is added indicating that the call was actually targeted for Bob 716 and that it was retargeted because of unconditional forwarding rules set on the UC server 714.

Figure 8:
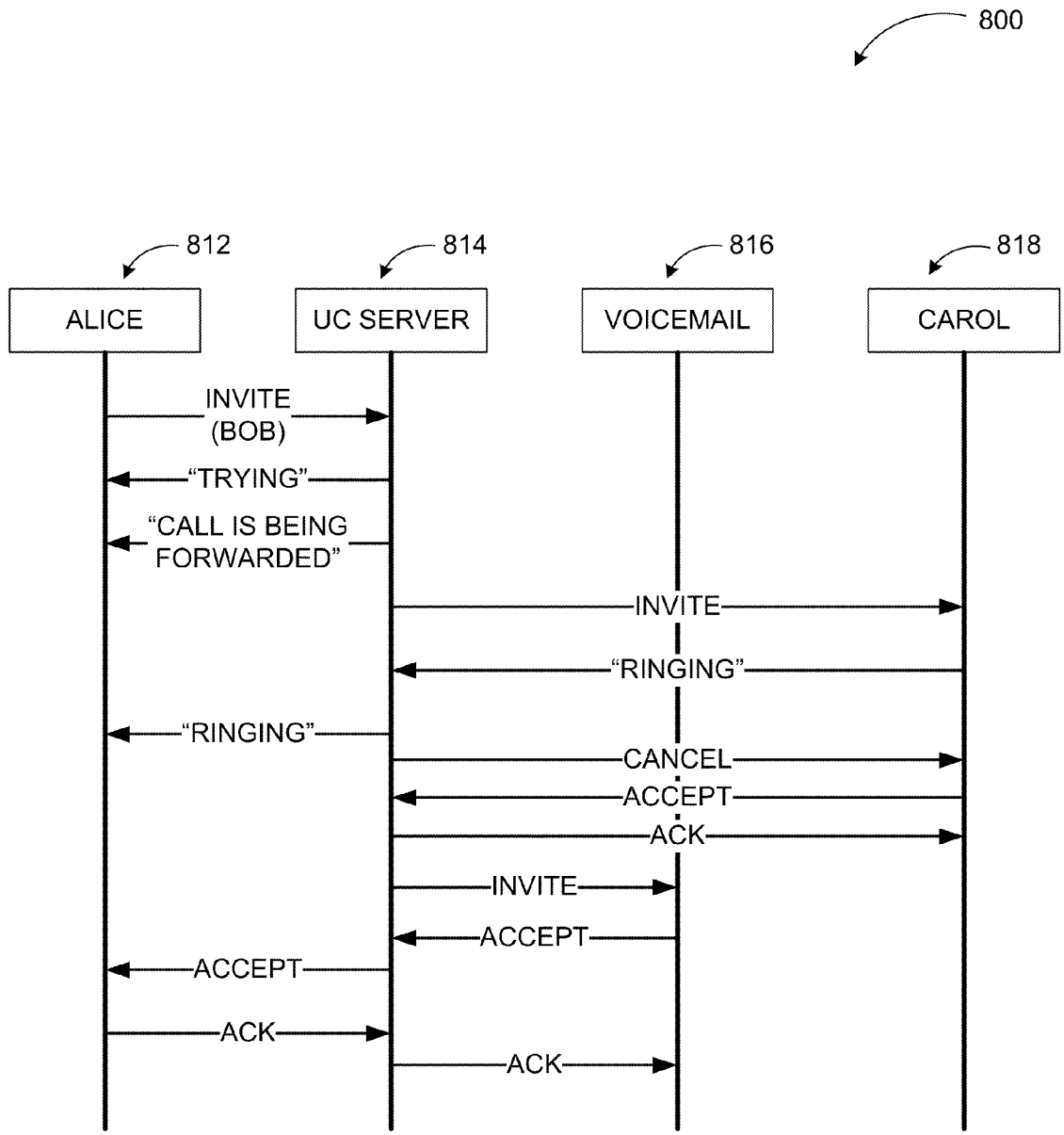

In the example scenario illustrated in diagram 800 of FIG. 8, Alice 812 calls Bob who has static unconditional forwarding set to Carol 818. UC server 814 forwards the call to Carol 818 as in the previous example. Differently from diagram 700, Carol 818 does not answer and after a timeout, UC server 814 terminates the call leg with Carol 818 sending a CAN- CEL request. Then, UC server 814 forwards the call to Bob's voicemail (816) with an INVITE and updates the history-info header indicating the fact that the call to Carol timed out. In the meantime, Alice 812 may be provided information that the call is now being forwarded to Bob's voicemail.

Figure 9:
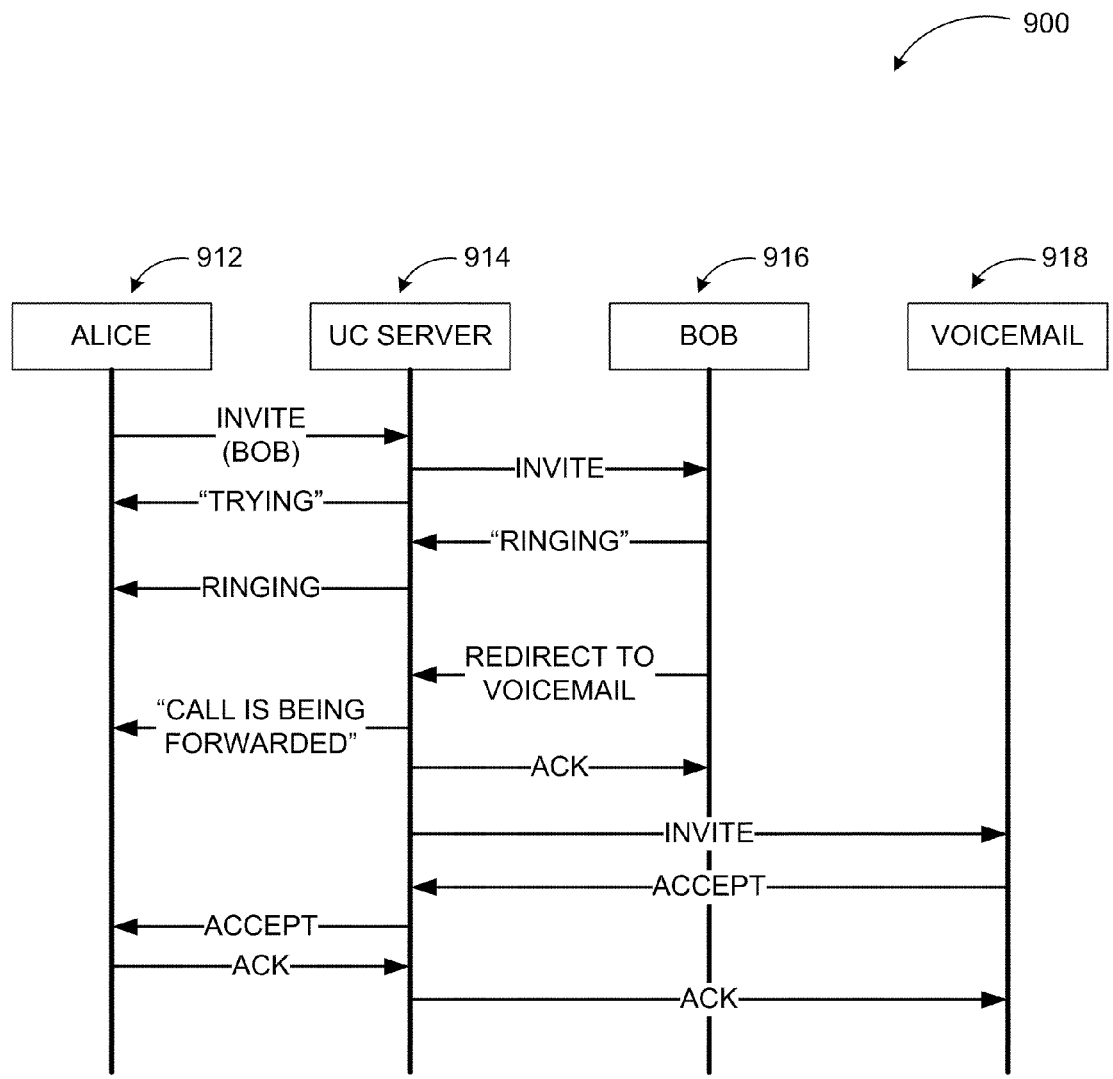

In the example scenario of diagram 900 in FIG. 9, a communication request from Alice 912 to Bob 916 is forwarded to Bob 916 by the UC server 914. Bob decides to deflect the request to his voicemail 918, which is done by the UC server 914 with an INVITE sent to voicemail 918 while notifying Alice 912 that the call is being forwarded to voicemail.

Figure 10:
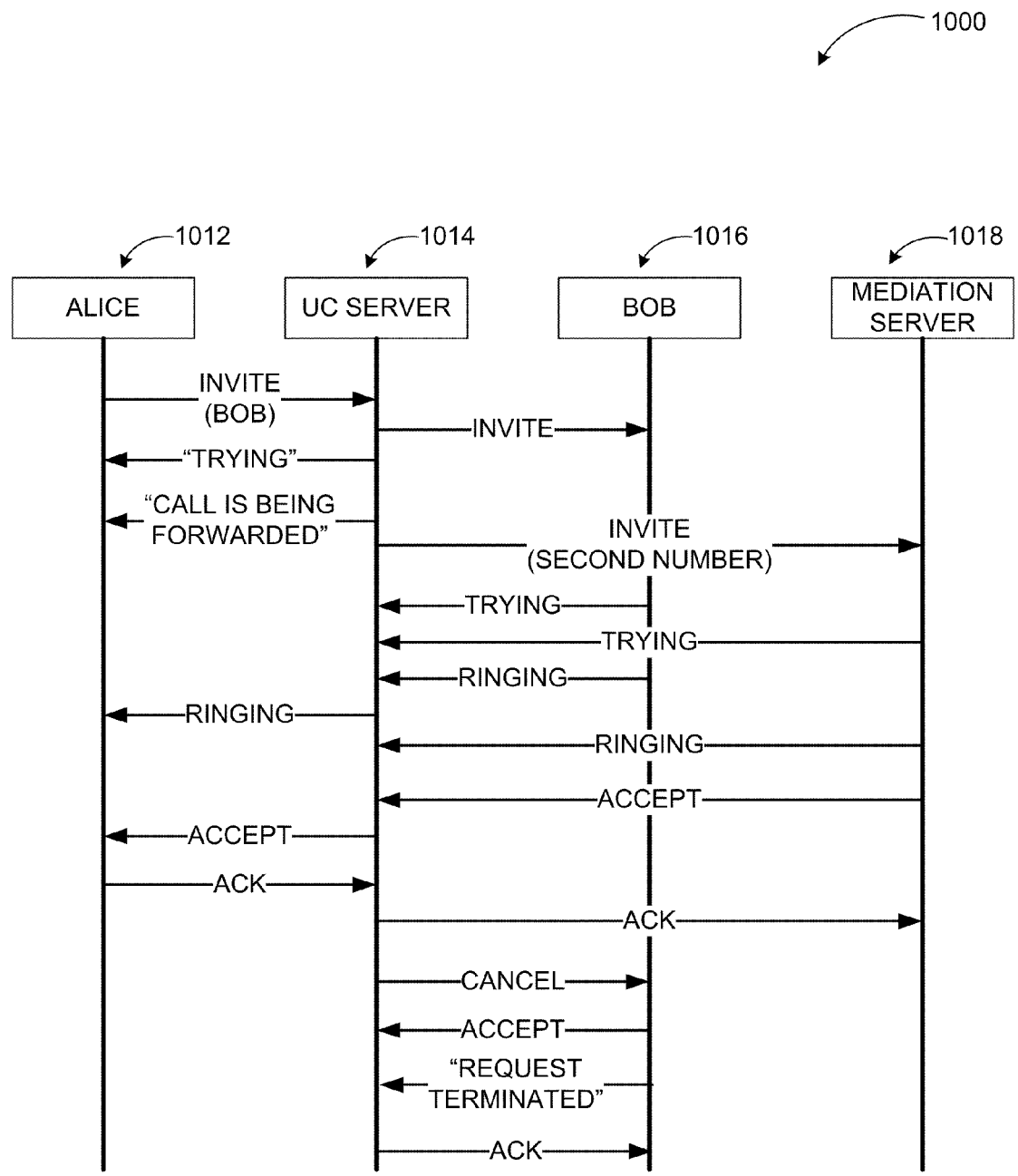

According to the example scenario illustrated in diagram 1000 of FIG. 10, Bob 1016 has instructed UC server 1014 to simultaneously notify his communication application and call a second number (inside or outside the system) when a communication request arrives targeting Bob. Thus, when Alice 1012 sends a request for Bob 1016, UC server 1014 sends out two INVITEs, one to Bob 1016 and another to mediation server 1018 for the second number (in the example case of an outside phone number).

Alice is notified about the progress of the call to Bob only for privacy reasons. When the second number accepts the call, a CANCEL notice is sent to Bob 1016 and the communication session request terminated before the call is facilitated between Alice and the second number through mediation server 1018.

Figure 11:
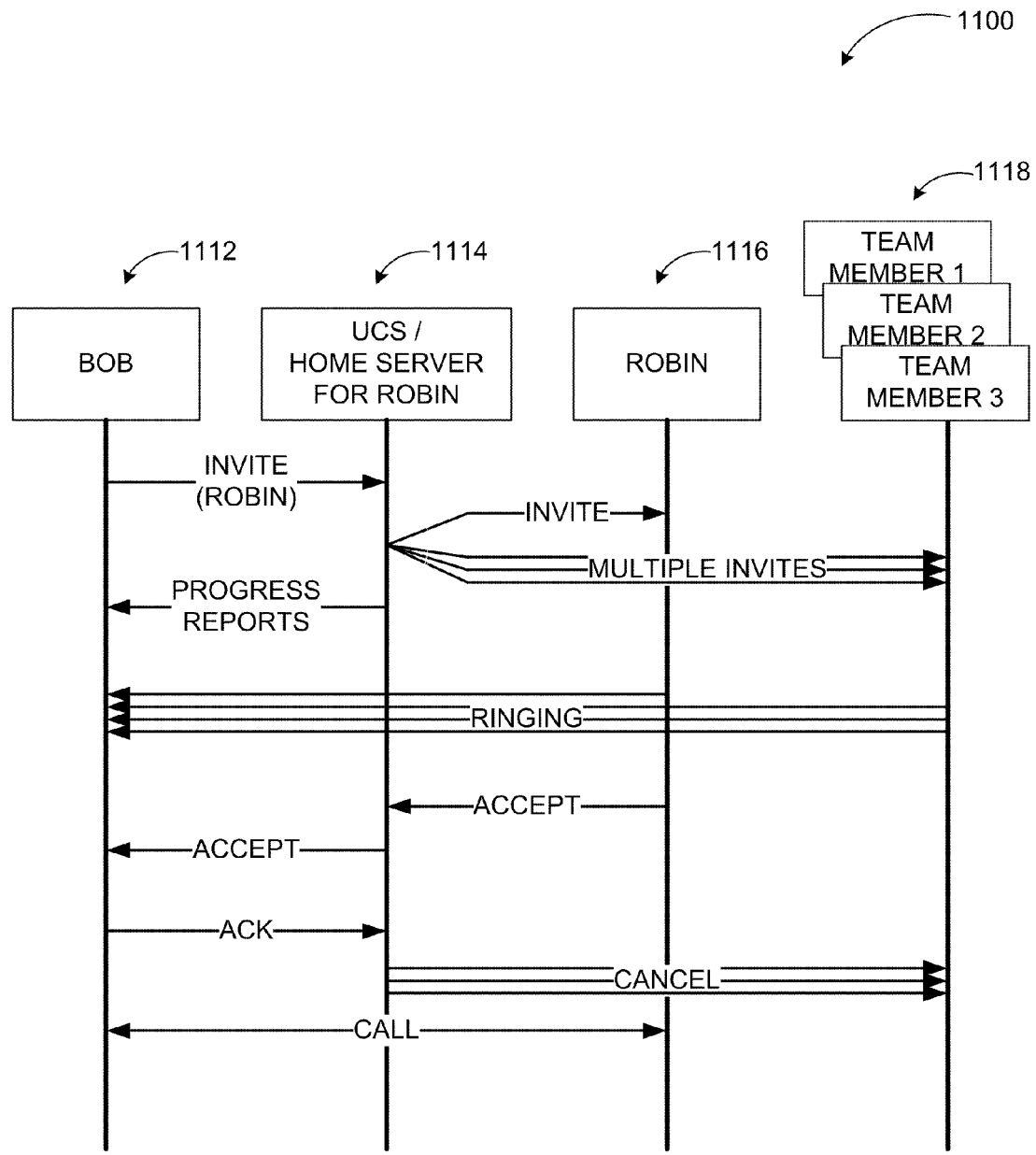

As mentioned previously, team calls may also be facilitated in a system according to embodiments. Diagram 1100 of FIG. 11 illustrates a call request (INVITE) from Bob 1112 to Robin 1116 arriving at UC server 1114, which is also Robin's home server. Robin has a static condition configured for calls to be directed to her team (1118) simultaneously with her. While multiple INVITEs are sent out, Bob is notified of the progress of the calls to Robin and her team. When Robin accepts the call personally, the INVITEs to her team (1118) are cancelled and the call facilitated between Bob and Robin.

Figure 12:
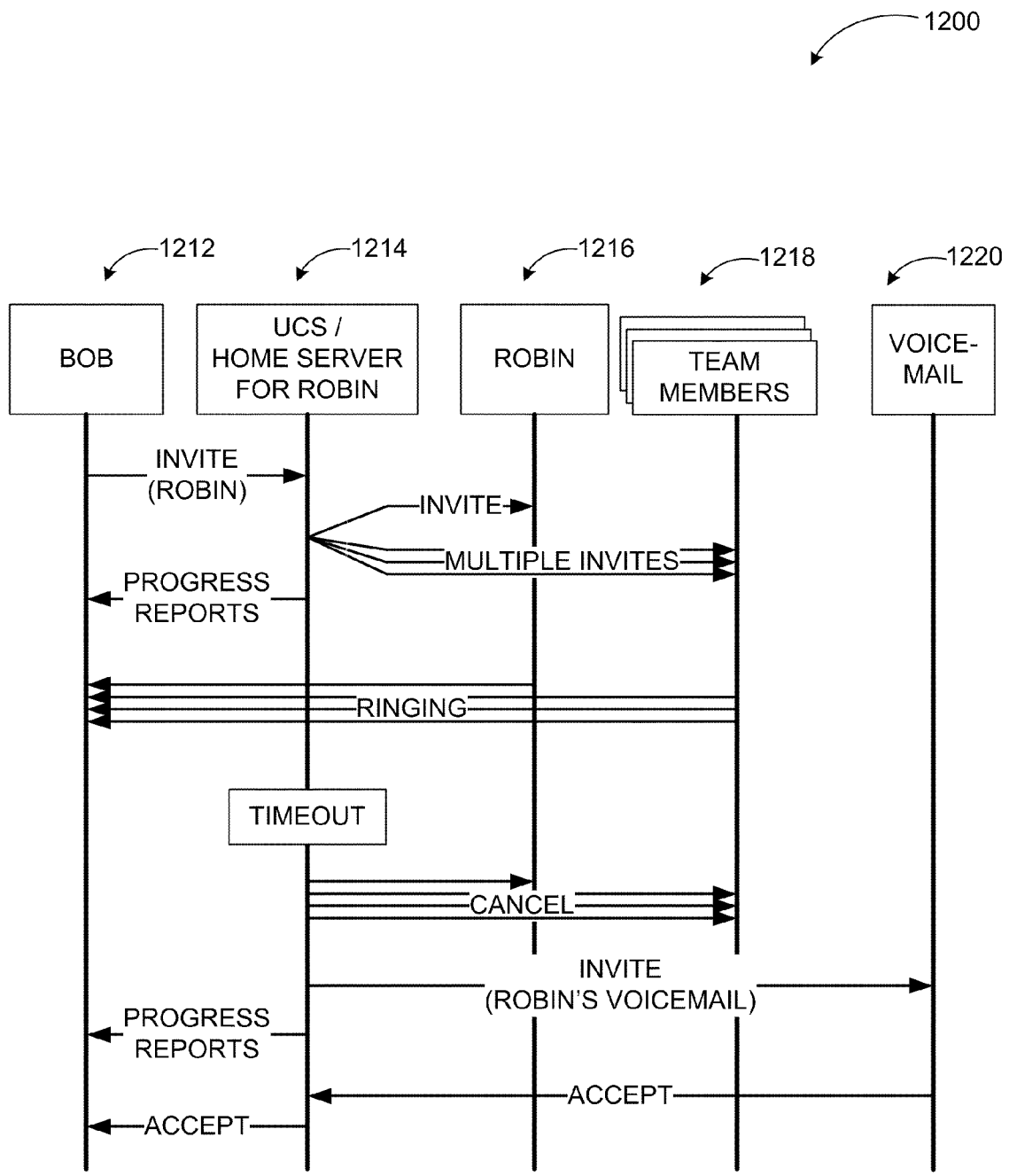

The example scenario in diagram 1200 of FIG. 12 is similar to that shown in diagram 1100. A communication session request from Bob 1212 is forwarded to Robin 1216 and her team 1218 by the UC server 1214 due to the simultaneous ring condition configured by Robin. However, the request times out due to non of the called parties accepting. Upon determining the timeout, UC server 1214 forwards the request to Robin's voicemail 1220 with an INVITE and updates the history-info indicating why the request was sent to the voicemail. For privacy purposes, the progress report to Bob may exclude the reason for the redirection of the call to the voicemail.

The above discussed scenarios, example systems, modalities, redirection types, and configurations are for illustration purposes. Embodiments are not restricted to those examples. Other forms of notifications, configurations, communication modes, and scenarios may be used in implementing routing of call requests with conveyance of service invocation information in a similar manner using the principles described herein.

Figure 13:
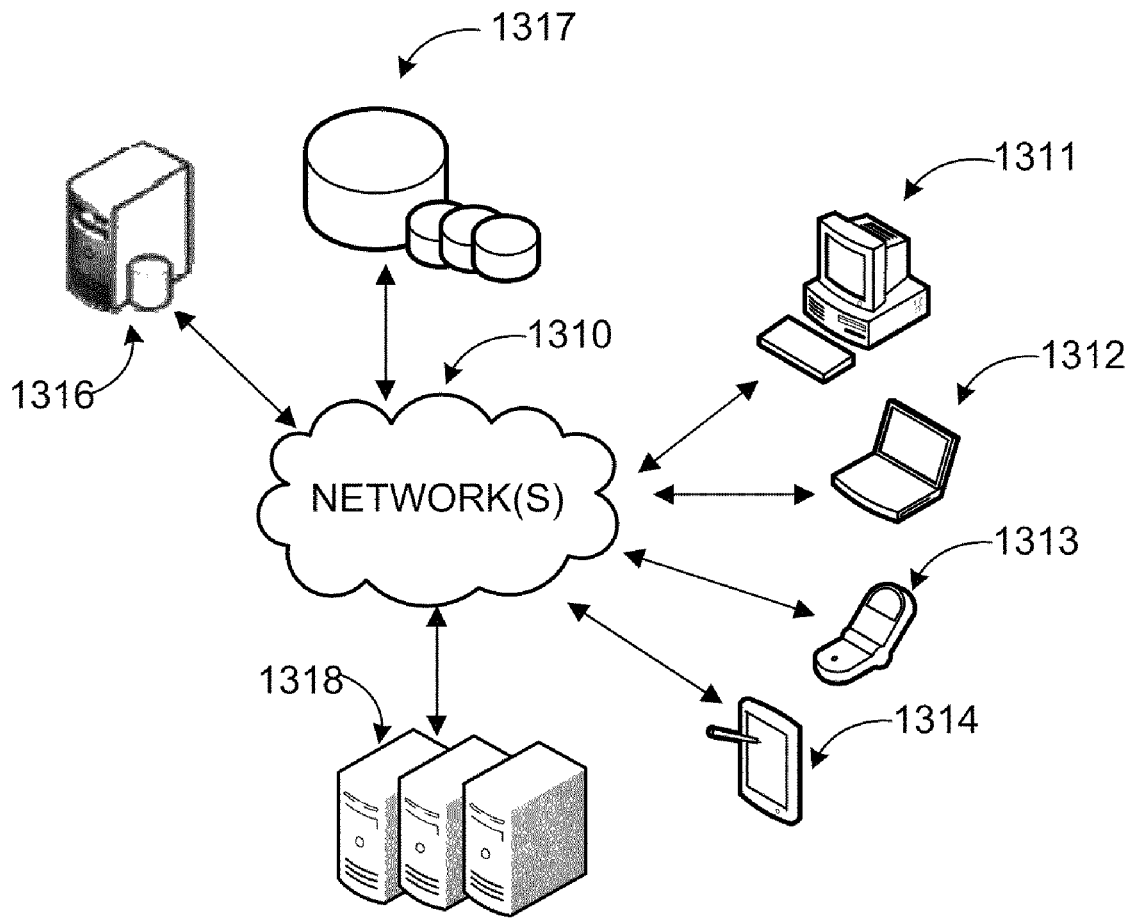
FIG. 13 is a networked environment, where a system according to embodiments may be implemented.

FIG. 13 is an example networked environment, where embodiments may be implemented. An enhanced communication system providing communication services conveying service invocation information for routed calls may be implemented via software executed over one or more servers 1318 such as a hosted service. The system may facilitate communications between client applications on individual computing devices such as a handheld computer 1314, smart phone 1313, a laptop computer 1312, and desktop computer 1311 ('client devices') through network(s) 1310.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 1311-1314 are used to facilitate communications through a variety of modes between subscribers of the communication system. A call initiated by one of the client devices 1311-1314 may be redirected through serial or parallel forking and go through multiple recipients before being established. As the call is being routed, service invocation information, as discussed above, may be provided to the caller and the recipients. Information associated with subscribers and facilitating multimodal conversations, as well as routing history and other data, may be stored in one or more data stores (e.g. data store 1317), which may be managed by any one of the servers 1318 or by database server 1316.

Network(s) 1310 may comprise any topology of servers, clients, Internet service providers, and communication media. A system according to embodiments may have a static or dynamic topology. Network(s) 1310 may include a secure network such as an enterprise network, an unsecure network such as a wireless open network, or the Internet. Network(s) 1310 may also coordinate communication over other networks such as PSTN or cellular networks. Network(s) 1310 provides communication between the nodes described herein. By way of example, and not limitation, network(s) 1310 may include wireless media such as acoustic, RF, infrared and other wireless media.

Many other configurations of computing devices, applications, data sources, and data distribution systems may be employed to implement a communication system with service invocation information provision for redirected calls. Furthermore, the networked environments discussed in FIG. 13 are for illustration purposes only. Embodiments are not limited to the example applications, modules, or processes.

Figure 14:
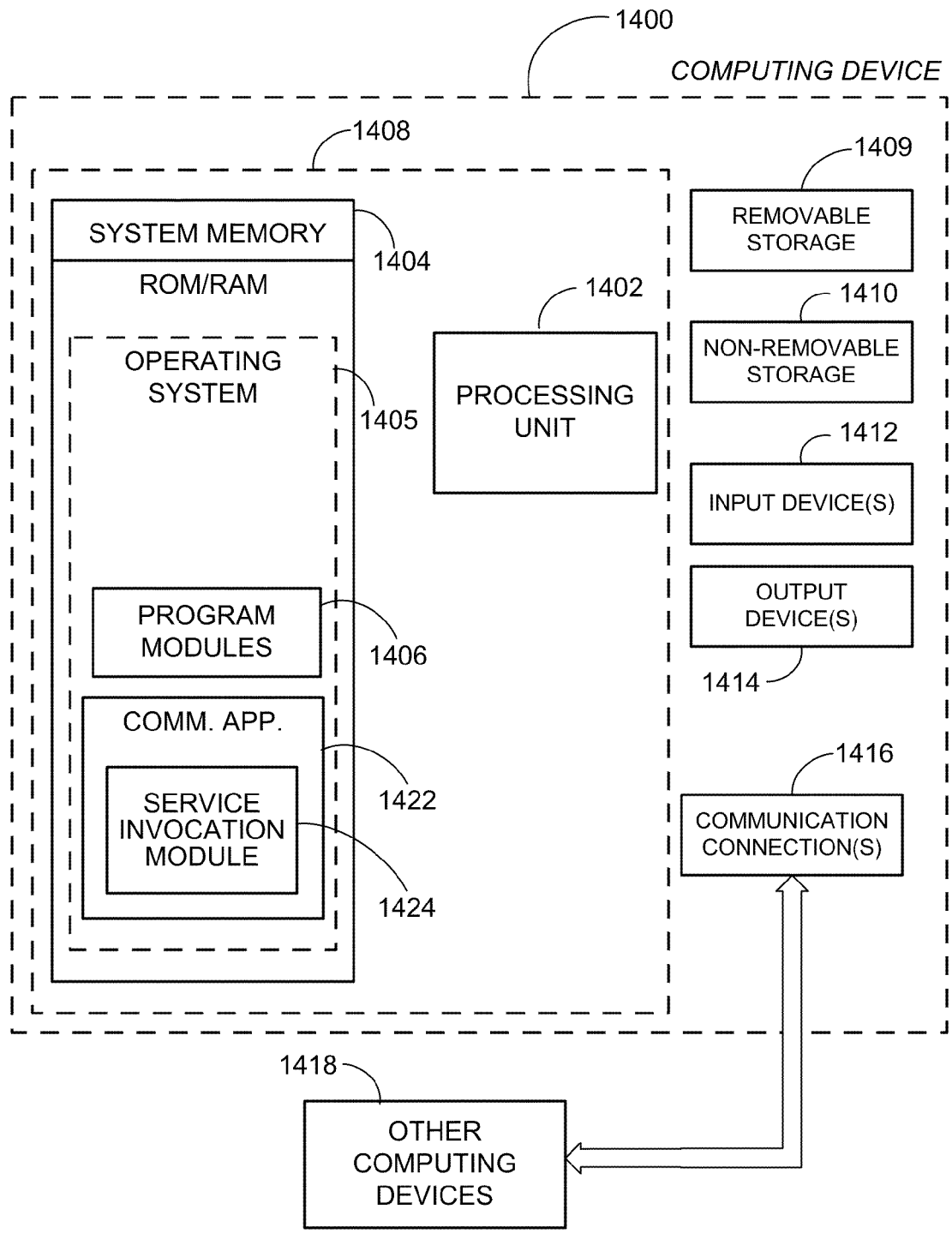
FIG. 14 is a block diagram of an example computing operating environment, where embodiments may be implemented.

FIG. 14 and the associated discussion are intended to provide a brief, general description of a suitable computing environment in which embodiments may be implemented. With reference to FIG. 14, a block diagram of an example computing operating environment for an application according to embodiments is illustrated, such as computing device 1400. In a basic configuration, computing device 1400 may be a client device as part of an enhanced communication system and include at least one processing unit 1402 and system memory 1404. Computing device 1400 may also include a plurality of processing units that cooperate in executing programs. Depending on the exact configuration and type of computing device, the system memory 1404 may be volatile (such as RAM), non-volatile (such as ROM, flash memory, etc.) or some combination of the two. System memory 1404 typically includes an operating system 1405 suitable for controlling the operation of the platform, such as the WINDOWS® operating systems from MICROSOFT CORPORATION of Redmond, Wash. The system memory 1404 may also include one or more software applications such as program modules 1406, communication application 1422, and service invocation module 1424.

Communication application 1422 may be part of a service that facilitates communication through various modalities between client applications, servers, and other devices. Service invocation module 1424 may enable client applications to forward a notification by forking in serial or in parallel.

This basic configuration is illustrated in FIG. 14 by those components within dashed line 1408. In a system according to embodiments, records may be synchronized through communication with dedicated servers for each of the distinct modalities of the conversation, multipurpose servers, or a combination of servers and endpoints of the communication system.

Computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by removable storage 1409 and non-removable storage 1410. Computer readable storage media may include volatile and nonvolatile, removable and non-removable media implemented in any method or technology for storage of information, such as computer readable instructions, data structures, program modules, or other data. System memory 1404, removable storage 1409 and non-removable storage 1410 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1400. Any such computer readable storage media may be part of computing device 1400. Computing device 1400 may also have input device(s) 1412 such as keyboard, mouse, pen, voice input device, touch input device, and comparable input devices. Output device(s) 1414 such as a display, speakers, printer, and other types of output devices may also be included. These devices are well known in the art and need not be discussed at length here.

Computing device 1400 may also contain communication connections 1416 that allow the device to communicate with other devices 1418, such as over a wireless network in a distributed computing environment, a satellite link, a cellular link, and comparable mechanisms. Other devices 1418 may include computer device(s) that execute communication applications, other directory or policy servers, and comparable devices. Communication connection(s) 1416 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 15:
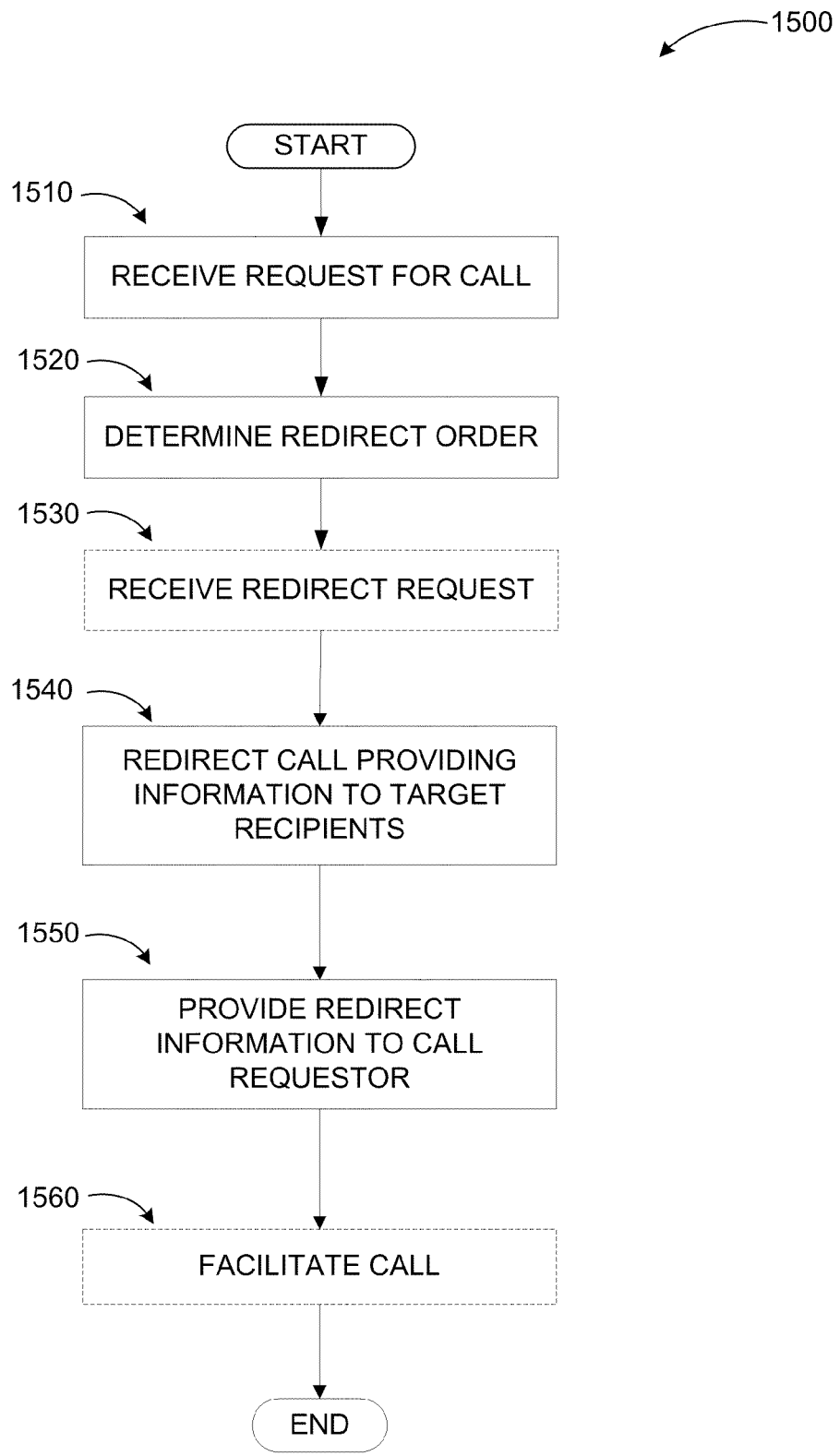
FIG. 15 illustrates a logic flow diagram for a process of providing call redirect information to a caller and called parties as the call request is being routed.

FIG. 15 illustrates a logic flow diagram for process 1500 of providing call redirect information to a caller and called parties as the call request is being routed. Process 1500 may be implemented as part of a communication system that facilitates multiple communication modes.

Process 1500 begins with operation 1510, where a request to initiate a single or multimodal communication session (call) is received. At operation 1520, a redirect order is determined based on system rules, target party defined rules, or real time action by the target party such as rejection of the call request. The redirect order may include routing of the call through serial forking, parallel forking, or a combination of the two.

At optional operation 1530, a redirect request may be received from the target party, which is an example of a real time action by the target party. At operation 1540, the call is routed following the system and/or recipient defined rules and real time actions by the recipients on the routing path. The call may be routed as delegation using serial forking or as team call using parallel forking. As the call is being routed, service invocation information such as routing history, reasons for redirection, and other optional information may be provided to the recipients. Similarly, service invocation information associated with the call request being routed is provided to the original requester at operation 1550. Any information provided to the recipients and the original requestor may be filtered based on system rules, recipient defined rules, and permission levels of the parties.

At operation 1560, the communication session is facilitated upon one or more recipients accepting the request. Some or all of the service invocation information provided during the routing of the call request may be persisted to provide the participants in the communication session a context.

The operations included in process 1500 are for illustration purposes. A communication service conveying service invocation information may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating a call in an enhanced communication system, comprising:
   receiving a request from a caller for initiating a communication session;
   determining a subscriber of the enhanced communication system for receiving the requested communication session;
   determining at least one other recipient subscriber to whom the communication session request is to be redirected based on at least one from a set of: a system default rule, a recipient predefined rule, and an action by the recipient;
   redirecting the communication session request to the at least one other recipient subscriber;
   providing service invocation information comprising at least one from a set of: information associated with the requesting caller, a redirection path of the communication session request, a subject matter of the requested communication session, and a reason for the redirection at each stage of the redirection to the at least one other recipient as the communication session request is being redirected, wherein the service invocation information is provided to the at least one other recipient through one of serial and parallel forking, and wherein the service invocation information is employed to present a graph of a redirection path of the communication session request to each recipient; and providing the service invocation information associated with the redirected communication session request to the requesting caller.

2. The method of claim 1, wherein the requesting caller is also a subscriber of the enhanced communication system.

3. The method of claim 1, wherein the redirect rule includes one of a system default rule and a subscriber defined rule.

4. The method of claim 1, further comprising:
redirecting the communication session request to the at least one other recipient subscriber in response to an action by the recipient subscriber.

5. The method of claim 1, wherein the service invocation information is provided as a history information header that is updated as the communication session request is redirected.

6. The method of claim 1, wherein the requested communication session is a multimodal communication session including at least one from a set of: an audio communication, a video communication, a data sharing session, a text messaging session, an application sharing session, a whiteboard sharing session, and an electronic mail exchange.

7. A communication system for conveying service invocation information while routing a communication session request, the system comprising:
a plurality of client devices for facilitating multimodal communications;
a server for managing the communication system, the server configured to:
receive a request from a caller for initiating a communication session;
determine a recipient for the requested communication session;
determine at least one other recipient to whom the communication session request is to be redirected based on at least one from a set of: a system default rule, a recipient predefined rule, and an action by the recipient;
redirect the communication session request to the at least one other recipient;
provide service invocation information comprising at least one from a set of: information associated with the requesting caller, a redirection path of the communication session request, a subject matter of the requested communication session, and a reason for the redirection at each stage of the redirection to the at least one other recipient as the communication session request is being redirected, wherein the service invocation information is provided to the at least one other recipient through one of serial and parallel forking, and wherein the service invocation information is employed to present a graph of a redirection path of the communication session request to each recipient; and
provide the service invocation information associated with the redirected communication session request to the requesting caller.

8. The system of claim 7, wherein Session Initiation Protocol (SIP) is utilized to facilitate communications within the communication system, and the server if further configured to:
provide the service invocation information through SIP headers.

9. The system of claim 8, wherein a separate SIP header is employed for each type of service invocation information.

10. The system of claim 8, wherein each type of service invocation information is provided through comma separated values in a SIP header.

11. The system of claim 7, wherein a particular recipient on the redirection path of the communication session request is presented in the graph a branch of the redirection path of the communication session request ending at that particular recipient.

12. A computer-readable memory device with instructions stored thereon for conveying service invocation information associated with redirected communication session requests, the instructions comprising:
in response to receiving a request from a caller for initiating a communication session, determining a target called party for the requested communication session;
determining at least one other party to whom the communication session request is to be redirected based on at least one from a set of: a system default rule, a target called party predefined rule, and an action by the target called party;
redirecting the communication session request to the at least one other party;
providing service invocation information comprising at least one from a set of: information associated with the requesting caller, a redirection path of the communication session request, a subject matter of the requested communication session, and a reason for the redirection at each stage of the redirection to the at least one other party and the caller as the communication session request is being redirected, wherein the service invocation information is provided to the at least one other target called party through one of serial and parallel forking, and wherein the service invocation information is employed to present a graph of a redirection path of the communication session request to each target called party; and
providing the service invocation information associated with the redirected communication session request to the requesting caller.

13. The computer-readable memory device of claim 12, wherein the service invocation information further includes presence information associated with the target called party.

14. The computer-readable memory device of claim 12, wherein the service invocation information is persisted upon establishment of the communication session.

* * * * *